(12) United States Patent
Matsubara

(10) Patent No.: US 7,812,980 B2
(45) Date of Patent: Oct. 12, 2010

(54) PRINT SHOP MANAGEMENT METHOD AND APPARATUS FOR PRINTING MIXED COLOR AND BLACK AND WHITE DOCUMENTS

(75) Inventor: Shigenori Matsubara, Irvine, CA (US)

(73) Assignee: Konica Minolta Systems Lab., Inc., Huntington Beach, CA (US)

( * ) Notice: Subject to any disclaimer, the term of this patent is extended or adjusted under 35 U.S.C. 154(b) by 972 days.

(21) Appl. No.: 11/529,897

(22) Filed: Sep. 28, 2006

(65) Prior Publication Data

US 2008/0079963 A1    Apr. 3, 2008

(51) Int. Cl.
*G06F 3/12*    (2006.01)
*G06K 15/00*    (2006.01)

(52) U.S. Cl. .................... 358/1.13; 358/1.15; 358/1.17; 358/1.18

(58) Field of Classification Search ................ 358/1.13, 358/1.15, 1.9, 2.1, 1.16, 1.17, 1.18, 1.1, 1.11
See application file for complete search history.

(56) References Cited

U.S. PATENT DOCUMENTS

| | | | |
|---|---|---|---|
| 6,614,549 B1 * | 9/2003 | Hlava | 358/1.15 |
| 6,783,288 B2 * | 8/2004 | Kato | 400/61 |
| 6,985,245 B1 * | 1/2006 | Takahashi | 358/1.15 |

* cited by examiner

*Primary Examiner*—James A Thompson
(74) *Attorney, Agent, or Firm*—Chen Yoshimura LLP

(57) ABSTRACT

A method is described for managing a print shop system in which a plurality of printers are connected to and managed by a server. To print a document having both color and black and white pages using N-up and/or duplex printing, the server determines whether to print the entire document on a color printer or to split the document into two sub-jobs and print them on a color printer and a black and white printer, respectively. To achieve this, pages of the document are grouped into groups each to be printed on sheet of paper. If different paper attributes are present within any group, the document is not split. If all groups of pages have identical paper attributes within the group, each group is examined to determine its color designation (e.g. color, black and white), so that the sheets can be printed on appropriate printers.

10 Claims, 6 Drawing Sheets

| sheet # | 1 | 2 | 3 | 4 | 5 | 6 | 7 |
|---|---|---|---|---|---|---|---|
| simplex/duplex | S | S | S | D | D | D | D |
| front side | P1 A4 | P2 A4 | P3 A3 | P4 A4 | P6 A3 | P8 A4 | P10 A4 |
| back side | ✕ | ✕ | ✕ | P5 A4 | P7 A3 | P9 A3 | ✕ |
| result | OK | OK | OK | OK | OK | NO | OK |

Fig. 4

PRINT SHOP MANAGEMENT METHOD AND APPARATUS FOR PRINTING MIXED COLOR AND BLACK AND WHITE DOCUMENTS

BACKGROUND OF THE INVENTION

1. Field of the Invention

This invention relates to a method and apparatus for managing a print shop system in which a plurality of printers are connected to and managed by a server. In particular, it relates to a method and apparatus of managing print jobs and printers in a print shop for printing documents that contain both color and black and white pages.

2. Description of Related Art

A professional print shop typically has a plurality of printers connected to a server by a network, where the server controls the printing of customer jobs on one or more printers. The printers in a print shop typically have different characteristics and capabilities. In particular, a print shop typically has both black and white printers and color printers. A conventional practice is to print documents containing only black and white pages (including gray level images) using black and white printers, and to print documents containing color pages using color printers. Printing with a color printer is typically more costly than printing with a black and white printer.

SUMMARY OF THE INVENTION

Many documents to be printed contain both color and black and white pages. Since color pages are more costly to print, it is desirable to separate a document into a color sub-document to be printed on a color printer and a black and white sub-document to be printed on a black and white printer.

Accordingly, the present invention is directed to a method of managing print jobs that contain both black and white and color pages.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other objects, as embodied and broadly described, the present invention provides a method for managing a print shop system, the print shop system including a plurality of categories of printers having different color capabilities, the method being implemented on a computer connected to the printers, the method including: (a) obtaining a source document to be printed, the source document including a plurality of pages each having one or more paper attributes and a color property; (b) obtaining an N-up parameter N and a duplex parameter D for each page of the source document; (c) grouping pages of the source document into one or more groups based on the parameters N and D, each group containing K=N*D or fewer pages which have identical N and D values and are to be printed on a single sheet of medium; and (d) determining whether all pages within each group have identical paper attributes, and if pages within any group have non-identical paper attributes, submitting the source document to be printed on a single category of printers.

In another aspect, the present invention provides a method for managing a print shop system, the print shop system including a plurality of categories of printers having different color capabilities, the method being implemented on a computer connected to the printers, the method including: (a) obtaining a source document to be printed, the source document including a plurality of pages each having one or more paper attributes and a color property; (b) obtaining an N-up parameter N and a duplex parameter D for each page of the source document; (c) grouping pages of the source document into one or more groups based on the parameters N and D, each group containing K=N*D or fewer pages which have identical N and D values and are to be printed on a single sheet of medium; (d) determining a color designation for each group based on color properties of the pages within the group; and (e) submitting the source document to one or more categories of printers based on the color designations determined in step (d).

In yet another aspect, the present invention provides computer program products that cause a data processing apparatus to perform the above methods.

It is to be understood that both the foregoing general description and the following detailed description are exemplary and explanatory and are intended to provide further explanation of the invention as claimed.

BRIEF DESCRIPTION OF THE DRAWINGS

FIG. 4 schematically illustrates a process according to embodiments of the present invention applied to a document having different paper sizes within a group of pages.

DETAILED DESCRIPTION OF THE PREFERRED EMBODIMENTS

Figure 6:
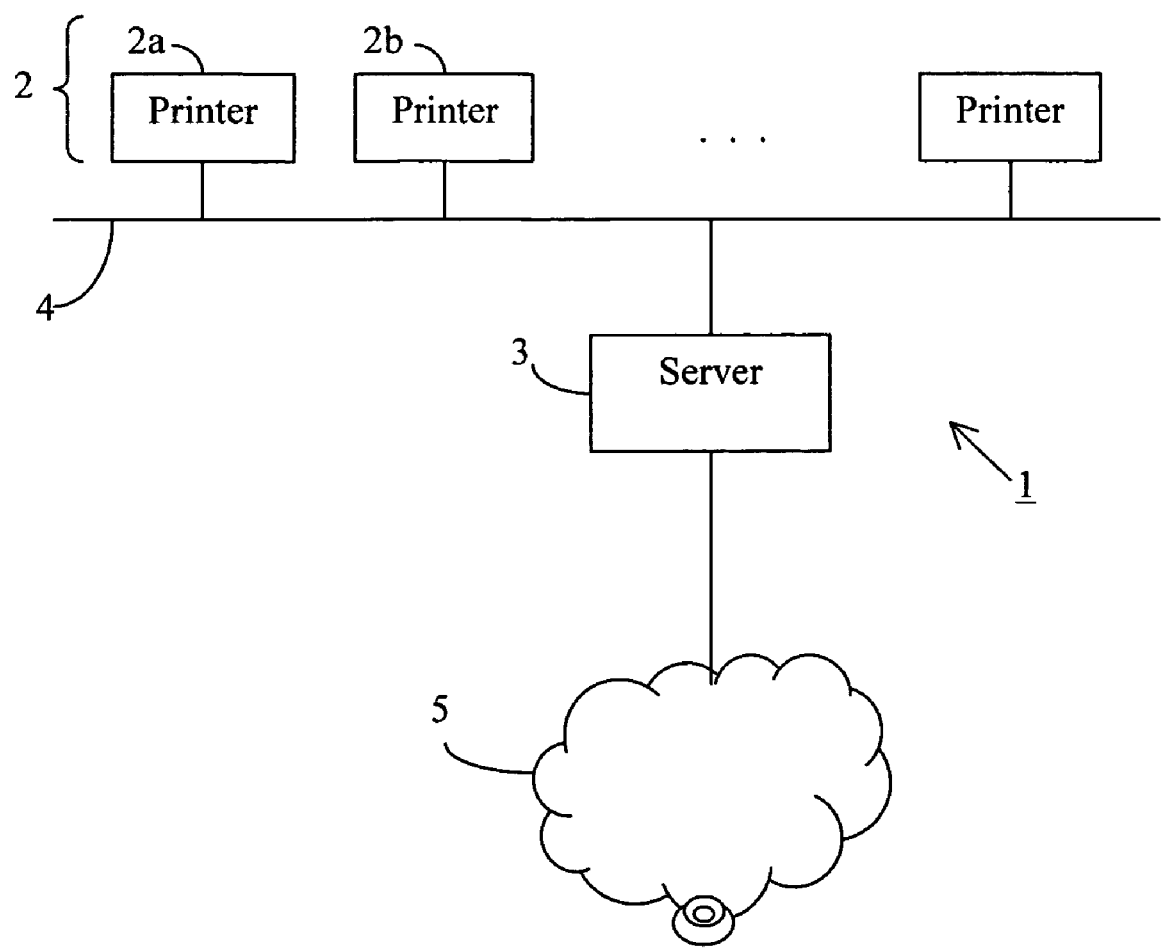
FIG. 6 schematically illustrates a print shop system having a plurality of printers connected to a server via a network in which methods according to embodiments of the present invention may be implemented.

FIG. 6 schematically shows a print shop system 1 having a plurality of printers 2*a*, 2*b*, . . . connected to a server (or any suitable data processing apparatus) 3 via a network 4. One or more user terminals (not shown) are also connected to the server to enable print shop operators to interact with the server and the rest of the system. The server 3 is preferably also connected to an external network 5 such as the Internet for receiving print jobs (i.e. print requests from customers and documents to be printed). The server 3, under control of print shop management software, receives print jobs from customers and submits print commands and data to be printed to one or more printers 2. The print shop management software may make various management decisions, such as which printer(s) to use for a print job, either automatically or under various degree of control of an operator.

When a document to be printed (herein after referred to as the source document) is a mixed color document, i.e. one that contains both color pages and black and white pages, the server 3 makes a determination as to whether to submit the entire print job (i.e. all pages of the source document) to one or more color printers, or to split the print job into two sub-jobs by submitting the color pages to one or more color printers and the black and white pages to one or more black and white printers. A method for determining whether to split a print job based on a cost calculation to minimize the total cost of printing the entire job is described in commonly owned, co-pending U.S. patent application Ser. No. 11/395,583, filed Mar. 31, 2006, entitled "Print Shop Management Method and Apparatus for Printing Mixed Color and Black and White Documents". The present application describes another method for determining whether to split a print job into two sub-jobs that is especially useful in situations where N-up (multiple pages of the source document printed on one sheet of paper), duplex (2-sided printing), or mixed paper (different paper requirement, see below) is involved.

If a print job is split into two sub-jobs and printed on a color printer and a black and white printer separately, the source document and the associated job ticket must be processed to separate the color and black and white pages in the document so that they can be submitted to different printers. A job ticket, which is associated with the source document, specifies various parameters governing the printing of the document, such as the number of copies, orientation, input tray, output tray, finishing instructions (staple, hole punch, etc.), etc. Exemplary methods for splitting a job ticket into two sub-job tickets, one for color printing and one for black and white printing, are described in commonly owned, co-pending U.S. patent application Ser. No. 11/395,585, filed Mar. 31, 2006, entitled "Method for Printing Mixed Color and Black and White Documents", which is incorporated by reference herein in its entirety. The present application describes a method for designating color properties of printed sheets, which allows the server to correctly split the job and generate the two sub-job tickets, especially when N-up, duplex, or mixed paper is involved.

After the two sub-job tickets are generated, they are submitted to the color and the black and white printers, respectively. The output pages from the color printer and the black and white printer would then be merged together according to the original page order of the source document to produce the printed document. Merging may be accomplished by first printing one sub-job on one printer, transporting the printed pages to a paper inserter unit of the other printer, then printing the other sub-job using the other printer. The paper inserter unit is a feeder of a printer that feeds the paper in it to the output tray of the printer, without printing on them, in a programmed order concurrently with the printing of another document by the printer. As a result, the pages in the paper inserter unit are merged with the concurrently printed pages according to the programmed order. The first printed sub-job may be either the color sub-job or the black and white sub-job, preferably depending on which has a smaller number of pages because they will take less time to insert during merging, or depending on which printer has the finishing capabilities required by the print job (such as stapling, hole punching, folding, etc.).

Figure 1:
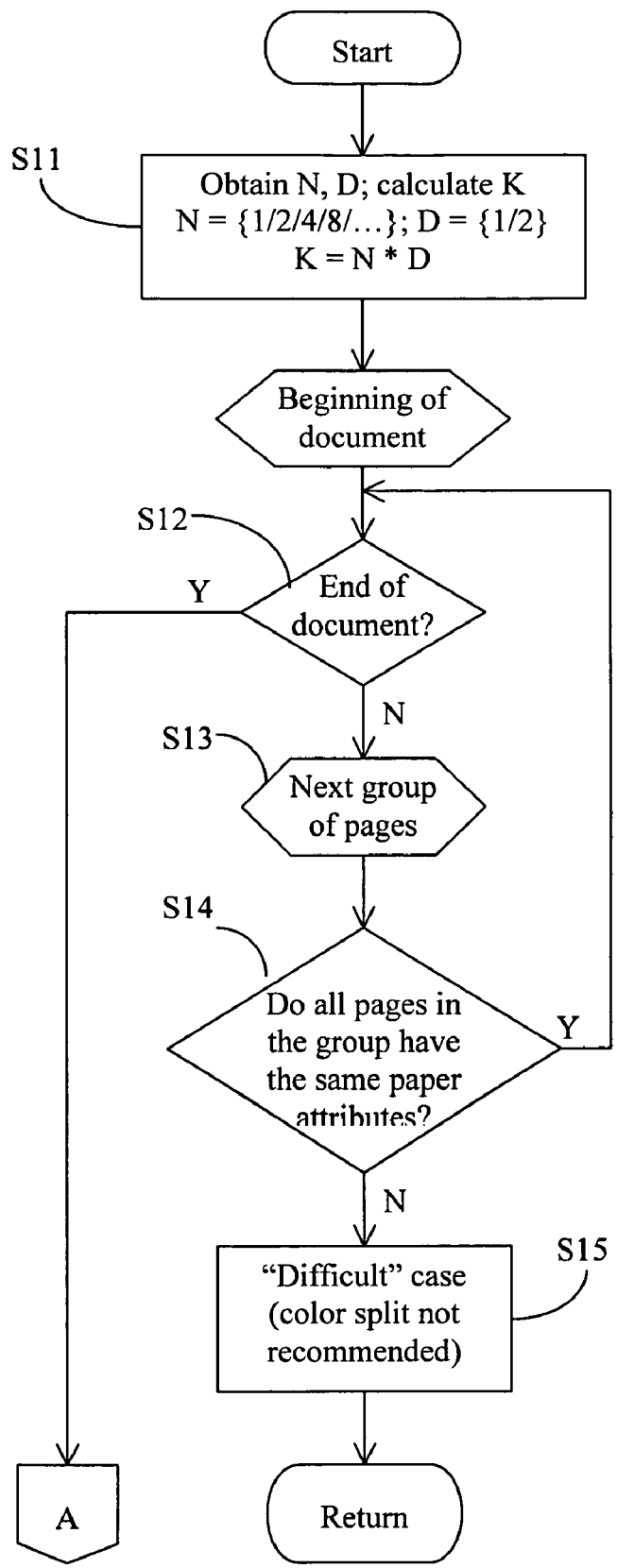
FIGS. 1-3 are flow charts illustrating methods for managing print jobs according to embodiments of the present invention.

Embodiments of the present invention are described now with reference to FIGS. 1 to 4. The processes may be implemented as software or firmware programs executed by the server or another computer, or implemented as hardware. The methods are especially useful when the printing involves N-up, duplex, or mixed paper. N-up refers to printing multiple pages of the source document on one side of a single sheet of paper. It is represented by an N-up parameter N, which may be any natural number, including but not limited to 1 (no N-up), 2 (2-on-1), 4, 8, etc. Duplex refers to printing on both sides of a sheet of paper, and is represented by a duplex parameter D where D=1 represents single-sided printing (or simplex) and D=2 represents two-sided printing (or duplex). Mixed paper refers to the situation where the source document includes pages that require papers with different paper attributes such as media type (plain paper, recycled paper, transparency, etc.), paper size, paper weight, paper color (white, red, yellow, etc.), pre-punch condition (pre-punch On or Off), etc. Typically, the source document and/or the job ticket will contain information about the paper attributes and color property (whether the content is color or black and white) of each page. When N-up and/or duplex printing is involved, pages of the source document are re-arranged to form the sheets to be printed, and each sheet is designated as either color or black and white to facilitate color split. In this disclosure, the term "pages" refers to the pages in the source document, and "sheets" refers to sheets of paper of the printed document, unless otherwise clear from the context. Thus, each sheet to be printed may be composed of multiple pages of the document and may have one or both sides printed. The re-arrangement of pages into sheets may be further complicated by mixed paper attributes in the source document. When executing N-up and/or duplex, multiple pages are generally printed on the same sheet of paper only if the pages require the same paper attributes. In a method according to one embodiment of the present invention as illustrated in FIG. 1, the program determines, based on an examination of the complexity of the source document, whether color split will be performed, i.e., whether the entire source document will be printed on a color printer (no color split) or whether it will be split into two sub-jobs printed on a color printer and a black and white printer separately (color split).

As shown in FIG. 1, the program first obtains the values of N (for N-up) and D (for duplex) from the job ticket or the source document (step S11). The value of N may be 1, 2, 4, 8, etc. and the value of D may be 1 or 2. The program calculates the product of N and D, K=N*D, which will be the number of pages per sheet. Then, starting from the beginning of the document, the program examines the next K consecutive pages of the source document as a group to determine whether all pages within the group are of the same paper attributes (steps S13, S14). If the K pages in a group are all of the same paper attributes ("Y" in step S14), the next group of K pages is examined (steps S13, S14), until the end of the document is reached ("Y" in step S12). If, however, the K pages in a group are not all of the same paper attributes ("N" in step S14), the document is treated as a "difficult" case for which color split is not recommended, and the process terminates (step S115). This is because such mixed paper attributes within a group of K pages (i.e. a sheet) will likely create ambiguities in the imposition. For a difficult case, all pages of the document will be printed on the same printer without color split. If the end of the document is reached with all groups having the same paper attributes within each group ("Y" in step S12), the document is treated as a "simple" case for which color split will be performed, and the process proceeds to the next stage ("A"), which will determine the color property (color or black and white) of each sheet. Note that in step S14, an "N" decision can be made without examining all pages in the group as soon as one page of a different attributes is encountered.

In the exemplary method illustrated in FIG. 1, it has been assumed that the values of N and D are constant throughout the source document, in which case they are obtained at the beginning of the process and the value K is calculated only once for the entire document. This may be referred to as a "uniform" printing case. Alternatively, the values of N and D may vary throughout the document, referred to as a non-uniform printing case, and the N and D values for each page or series of pages are specified by the job ticket or in the document. For example, the job ticket may specify that pages 1-5 are simplex, pages 6-10 are duplex, etc. To accommodate a non-uniform printing case, step S11 (obtaining N and D and calculating K) should be located between steps S12 and S13.

In other words, after one group is processed, the program will obtain the N and D values for the next page. A more general process flow (not shown) provides step S11 between steps S12 and S13, and provides a bypass around step S11 for all groups subsequent to the initial group if it is known that the N and D values are constant for the entire document. In a non-uniform printing case, a group may have fewer than K pages, and each group contains pages having identical N and D values. For example, the document may specify that pages 1-5 are duplex and pages 6-10 are simplex (with N=1 for all pages). Thus, pages 1 and 2 will form a group, pages 3 and 4 will form a group, but page 5 will not form a group (duplex) with page 6 because page 6 is a simplex. As a result, page 5 by itself forms a group, which has fewer than K=N*D pages. Page 5 will be printed as a simplex even though it is specified as a duplex. The step S13 in FIG. 1 is programmed to handle such complex situations to properly identify each group of pages based on the N and D values for the pages, whether a group contains K pages or fewer than K pages.

Described more generally, the process shown in FIG. 1 groups the pages of the source documents into one or more groups based on the N-up parameter N and the duplex parameter D specified for the pages, where each group contains K=N*D or fewer pages with identical N and D values, and determines whether the paper attributes are identical for all pages within each group. The process terminates as soon as a group including pages of different paper attributes is encountered, or proceeds to the next stage if none of the groups includes pages of different paper attributes.

Of course, the job ticket or the document may specify that all pages within the document have the same paper attributes. In such a case, steps S13 and S14 can be skipped altogether and the process will proceed directly to the next stage ("A").

Figure 2:
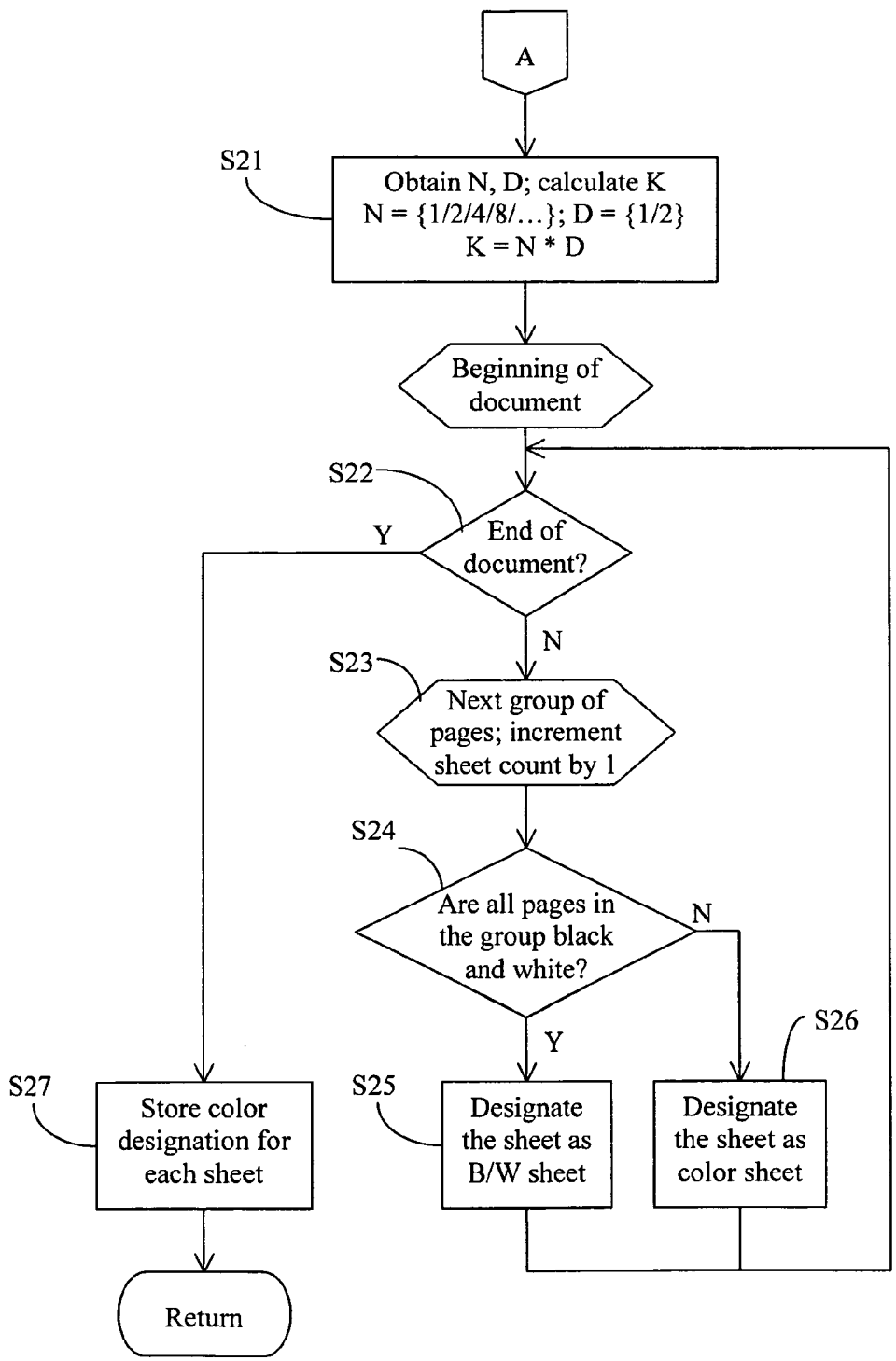
Figure 3:
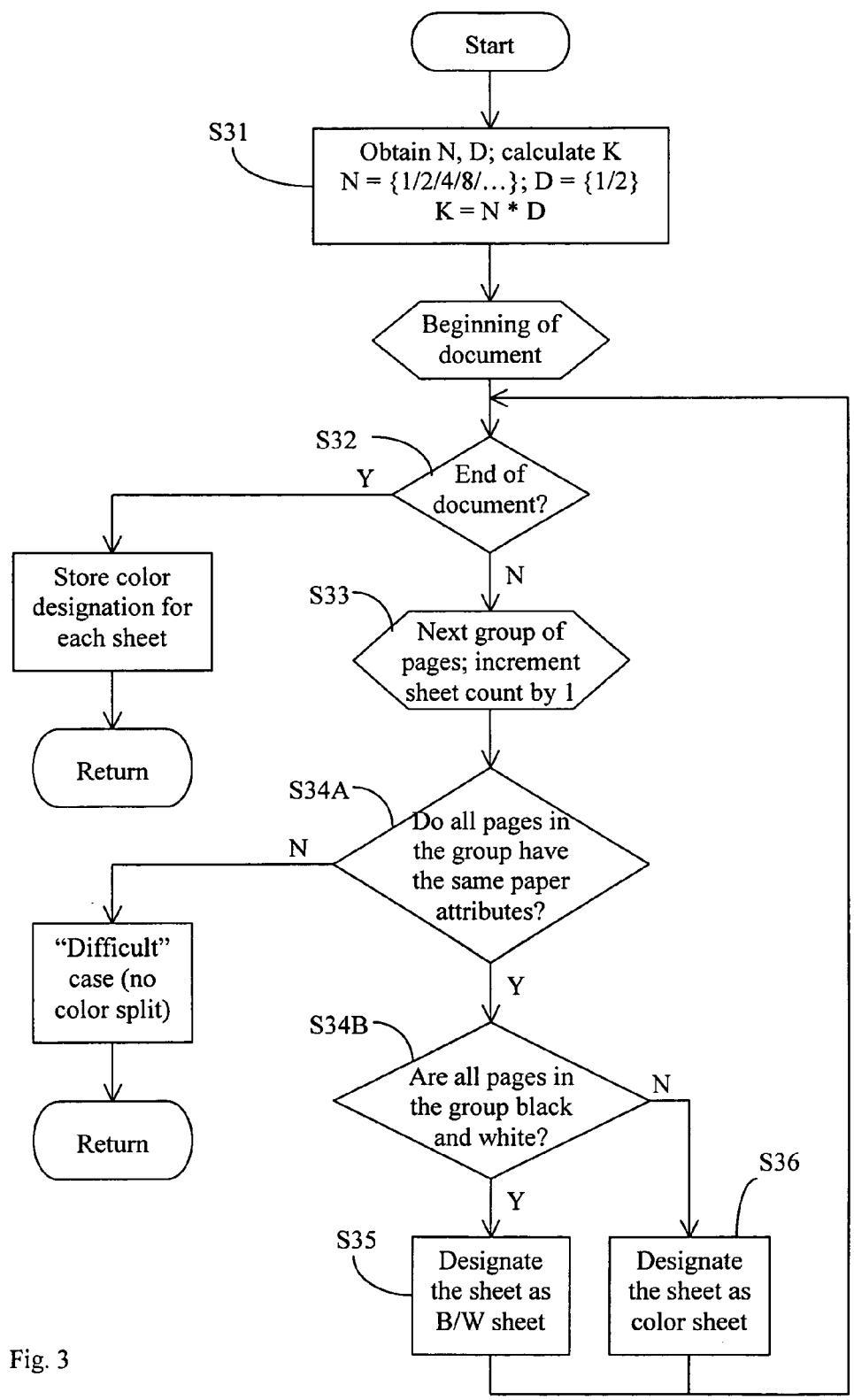

In the next stage of the process, illustrated in FIG. 2, the program determines the color property of each sheet, i.e., whether each sheet is designated as a color sheet or a black and white sheet. The program first obtains the values of N and D from the job ticket or the source document and calculates K=N*D (step S21). Then, the program examines the next K consecutive pages of the source document as a group to determine whether all pages within the group are black and white (steps S23, S24). If all K pages in the group are black and white ("Y" in step S24), the sheet is designated as a black and white sheet (step S25). Otherwise ("N" in step S24), the sheet is designated as a color sheet (step S26). Note that in step S24, an "N" decision can be made without examining all pages in the group as soon as one color page is encountered. The next group of pages is examined, until the end of the document is reached ("Y" in step S22). At this point, all sheets (groups of pages) have been designated as either black and white or color, and the color designation of the sheets is stored (step S27) to be used by the server to perform color split, as described in the above-mentioned commonly owned patent application Ser. No. 11/395,585.

Similar to FIG. 1, the exemplary method illustrated in FIG. 2 illustrates a uniform printing case where the values of N and D are constant throughout the source document. Alternatively, in a non-uniform printing case where the values of N and D vary within the document, step S21 will be located between steps S22 and S23. In other words, after one group of pages is processed, the process will obtain the N and D values for the next group. Again, a more general process flow (not shown) provides step S21 between steps S22 and S23, and provides a bypass around step S21 for all groups subsequent to the initial group if it is known that the N and D values are constant for the entire document. Also, the step S23 is programmed to handle the situations in a non-uniform printing case where a group has fewer than K pages, so as to properly identify each group of pages whether it has K pages or fewer than K pages. In this case, the program will also store the grouping of pages, i.e., information about which pages of the source document form a sheet of the printed document.

Described more generally, the process shown in FIG. 2 groups the pages of the source documents into one or more groups based on the N-up parameter N and the duplex parameter D specified for the pages, where each group has K=N*D or fewer pages, and determines whether all pages within each group are black and white. If all pages within a group are black and white, the group (sheet) is designated as black and white; otherwise the group (sheet) is designated as color.

It should be noted that the methods shown in FIG. 1 and FIG. 2 may be practiced separately. In other words, the server may process the document according to the method shown in FIG. 1 to determine whether color split is to be performed without actually performing the color split (which can be performed later), and the server may process the document according to the method shown in FIG. 2 after it has been previously determined that the document is suitable for color split.

It may be observed that the general program flow in the first stage process of FIG. 2 and the second stage process of FIG. 2 are similar. In both process, the program processes a group of K or fewer pages at a time, and determines whether all pages in the group are of the same paper attributes (in FIG. 1) or whether all pages in the group are black and white (in FIG. 1). In an alternative method shown in FIG. 3, the two processes may be combined, so that the program obtains a group of pages (step S33), examines the pages in the group to first determine whether they are of the same paper attributes (step S34A) and then determine whether they are all black and white (step S34B). If the pages of a group are not of the same paper attributes ("N" in step S34A), the document is a difficult case and the program returns; otherwise the program obtains the next group of pages and repeats the process until the end of the document is reached ("Y" in step S32). An advantage of this alternative method is that the document is processed in only one pass. An advantage of the method of FIGS. 1 and 2, on the other hand, is that if the document is determined to be a difficult case in the process of FIG. 1, the process of FIG. 2 will not be done at all.

Figure 5:
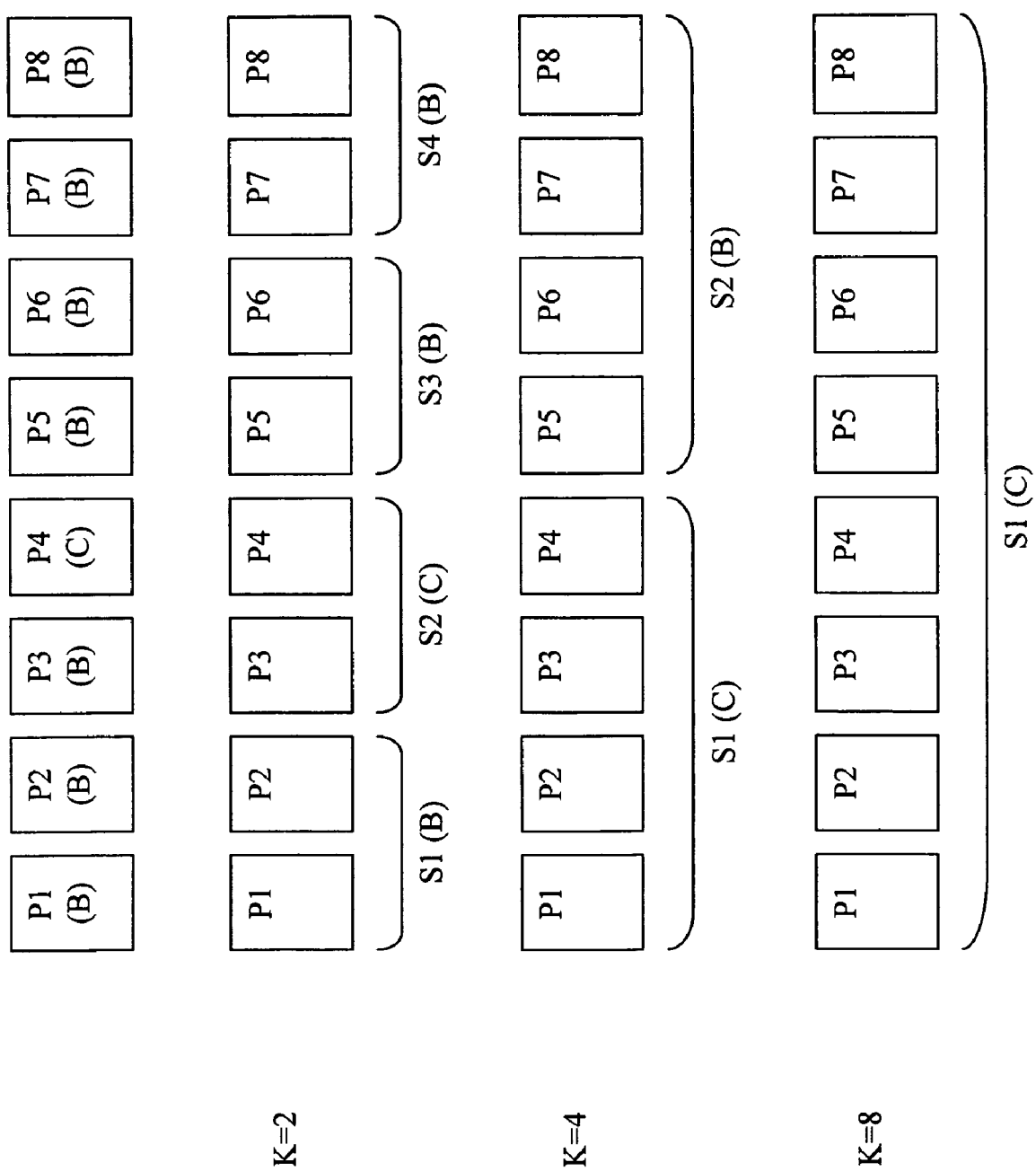
FIG. 5 schematically illustrates a process according to embodiments of the present invention applied to a document having both color and black and white pages.

The application of the method described above to various documents is illustrated by way of examples in FIGS. 4 and 5. FIG. 4 illustrates an example of a "difficult" case due to different paper sizes, where color split is not recommended. In this example, the document has 10 pages, where pages 1-3 are simplex and pages 4-10 are duplex, and there is no N-up. The paper sizes for the pages are as follows (A4 size: 210 mm×297 mm; A3 size: 297 mm×420 mm):

[A4] [A4] [A3] [A4] [A4] [A3] [A3] [A4] [A3] [A4]

As illustrated in FIG. 4, sheets 1-3 consist of pages 1-3, respectively in simplex; sheet 4 consists of pages 4 and 5 in duplex (both A4 size); and sheet 5 consists of pages 6 and 7 in duplex (both A3 size). Sheets (groups) 1-5 will pass the test of step S12 because all pages within each group have the same paper size. Sheet 6, on the other hand, would consist of pages 8 and 9, which have different paper sizes. As a result, the determination of step S12 will return a No result and the document is determined to be a "difficult" case.

FIG. 5 illustrates an example of determining the color designation of a sheet when N-up and/or duplex is involved. As shown in FIG. 5, top row, the source document has a series of eight pages (P1 to P8) where the fourth page (P4) is color and the rest are black and white. If K=2 (for example, either N=1, D=2 or N=2, D=1), four sheets (S1 to S4) will be formed, where the second sheet (S2) will be designated as color and the rest black and white (second row in FIG. 5). If K=4 (for example, either N=2, D=2 or N=4, D=1), two sheets (S1 to S2) will be formed, where the first sheet (S1) will be designated as color and the second black and white (third row in FIG. 5). If K=8 (for example, either N=4, D=2 or N=8, D=1), one sheet (S1) will be formed and it will be designated as color (fourth row in FIG. 5).

In the above descriptions, the term "black and white" includes gray scales if the black and white printers are capable of printing gray scale images (e.g. using half-toning or some other suitable method). If, on the other hand, the black and white printers available at a print shop are not capable of printing gray scales, and gray scales must be printed on a color printer, then the server will treat a page with gray scale images as a color page. Further, the methods may be applied in a print shop system that includes monochromic printers, i.e., printers that can print only one color (e.g. only red) or shades of one color. In such a situation, the determination to be made will be whether a source document that contains both full color pages (i.e. pages having more than one color) and monochromic pages are supposed to be printed entirely by a color printer or be split into two sub-jobs, one for a monochromic printer and one for a color printer. (Note that a black and white printer is a monochromic printer.) As another alternative, a print shop may have black and white printers, full color printers, and monochromic printers for a non-black color, and the server will determine whether to print a mixed source document on one, two or more of these printers. More generally, embodiments of the present invention are directed to methods for managing a print shop system that has two or more categories of printers each having a different color capability such as black and white, color or the other examples described above, where the server determines whether to print a document to one, two or more categories of printers based on the complexity of the source document and determines the color designation for each sheet to be printed. When the server analyzes the source document to determine the color characteristics of the sheets, it uses definitions of color categories, e.g., black and white, color, etc., that correspond to the color capabilities of the categories of printers. In other words, steps S24, S25 and S26 shown in FIG. 2 can be more broadly described as a step of determining the color designation for each group of pages (each sheet). The definitions of color categories may be programmed into the server software by the operator to suit the need of the particular shop.

While the embodiments have been described as being applied in a print shop environment, the invention is not limited to any physical setting of a shop, and can be applied to a print shop system having a distributed setting where printers at different locations are connected to a server.

It will be apparent to those skilled in the art that various modification and variations can be made in the print shop management method and apparatus of the present invention without departing from the spirit or scope of the invention. Thus, it is intended that the present invention cover modifications and variations that come within the scope of the appended claims and their equivalents.

What is claimed is:

1. A method for managing a print shop system, the print shop system including a plurality of printers including one or more color printers and one or more black and white printers, the method being implemented on a computer connected to the printers, the method comprising:
   (a) obtaining a source document to be printed, the source document including a plurality of pages each having one or more paper attributes and a color property, wherein the paper attributes specify characteristics of a medium on which the page is to be printed;
   (b) obtaining an N-up parameter N and a duplex parameter D for each page of the source document, wherein the N-up parameter N specifies a number of pages of the source document to be printed on a side of a single sheet of medium;
   (c) grouping pages of the source document into one or more groups based on the parameters N and D, each group containing K=N*D or fewer pages which have identical N and D values and are to be printed on a single sheet of medium; and
   (d) determining whether all pages within each group have identical paper attributes, and if pages within any group have non-identical paper attributes, submitting the source document to be printed either on one or more color printers or on one or more black and white printers but not on a mixture of color printers and black and white printers.

2. The method of claim 1, further comprising:
   (e) if all pages within a group have identical paper attributes, determining a color designation for the group based on the color properties of the pages within the group; and
   (f) submitting the source document to one or more color printers or to one or more black and white printers or to a mixture of color printers and black and white printers based on the color designations determined in step (e).

3. The method of claim 1, wherein the one or more paper attributes include one or more of media type, paper size, paper weight, paper color, and pre-punch condition.

4. A method for managing a print shop system, the print shop system including a plurality of printers including one or more color printers and one or more black and white printers, the method being implemented on a computer connected to the printers, the method comprising:
   (a) obtaining a source document to be printed, the source document including a plurality of pages each having one or more paper attributes and a color property, wherein the paper attributes specify characteristics of a medium on which the page is to be printed;
   (b) obtaining an N-up parameter N and a duplex parameter D for each page of the source document, wherein the N-up parameter N defines a number of pages of the source document to be printed on a side of a single sheet of medium;
   (c) grouping pages of the source document into one or more groups based on the parameters N and D, each group containing K=N*D or fewer pages which have identical N and D values and are to be printed on a single sheet of medium;
   (d) determining a color designation for each group based on the color properties of the pages within the group; and
   (e) determining whether all pages within each group have identical paper attributes, and if yes, submitting the source document to one or more color printers or to one or more black and white printers or to a mixture of color printers and black and white printers based on the color designations determined in step (d).

5. The method of claim 4, wherein the one or more paper attributes include one or more of media type, paper size, paper weight, paper color, and pre-punch condition.

6. A computer program product comprising a computer usable medium having a computer readable program code embedded therein for controlling a data processing apparatus, the computer readable program code configured to cause the data processing apparatus to execute a process for managing a print shop system, the print shop system including a plurality of printers including one or more color printers and one or more black and white printers connected to a server, the process comprising:

(a) obtaining a source document to be printed, the source document including a plurality of pages each having one or more paper attributes and a color property, wherein the paper attributes specify characteristics of a medium on which the page is to be printed;

(b) obtaining an N-up parameter N and duplex parameter D for each page of the source document, wherein the N-up parameter N defines a number of pages of the source document to be printed on a side of a single sheet of medium;

(c) grouping pages of the source document into one or more groups based on the parameters N and D, each group containing K=N*D or fewer pages which have identical N and D values and are to be printed on a single sheet of medium; and (d) determining whether all pages within each group have identical paper attributes, and if pages within any group have non-identical paper attributes, submitting the source document to be printed either on one or more color printers or on one or more black and white printers but not on a mixture of color printers and black and white printers.

7. A computer program product of claim 6, wherein the process further comprises:

(e) if all pages within a group have identical paper attributes, determining a color designation for the group based on the color properties of the pages within the group; and (f) submitting the source document to one or more color printers or to one or more black and white printers or to a mixture of color printers and black and white printers based on the color designations determined in step (e).

8. The computer program product of claim 6, wherein the one or more paper attributes include one or more of media type, paper size, paper weight, paper color, and pre-punch condition.

9. A computer program product comprising a computer usable medium having a computer readable program code embedded therein for controlling a data processing apparatus, the computer readable program code configured to cause the data processing apparatus to execute a process for managing a print shop system, the print shop system including a plurality of printers including one or more color printers and one or more black and white printers connected to a server, the process comprising:

(a) obtaining a source document to be printed, the source document including a plurality of pages each having one or more paper attributes and a color property, wherein the paper attributes specify characteristics of a medium on which the page is to be printed;

(b) obtaining an N-up parameter N and duplex parameter D for each page of the source document, wherein the N-up parameter N defines a number of pages of the source document to be printed on a side of a single sheet of medium;

(c) grouping pages of the source document into one or more groups based on the parameters N and D, each group containing K=N*D or fewer pages which have identical N and D values and are to be printed on a single sheet of medium;

(d) determining a color designation for each group based on the color properties of the pages within the group; and (e) determining whether all pages within each group have identical paper attributes, and if yes, submitting the source document to one or more color printers or to one or more black and white printers or to a mixture of color printers and black and white printers based on the color designations determined in step (d).

10. The computer program product of claim 9, wherein the one or more paper attributes include one or more of media type, paper size, paper weight, paper color, and pre-punch condition.

* * * * *